United States Patent [19]

Förster

[11] 4,284,464
[45] Aug. 18, 1981

[54] APPARATUS FOR MAKING CORNER JOINTS OF SEALING PROFILES FOR WINDOWS, DOORS OR THE LIKE

[75] Inventor: Arthur Förster, Munich, Fed. Rep. of Germany

[73] Assignee: Deventer GmbH & Co., Munich, Fed. Rep. of Germany

[21] Appl. No.: 184,247

[22] Filed: Sep. 5, 1980

[30] Foreign Application Priority Data

Jan. 15, 1980 [DE] Fed. Rep. of Germany ... 8000905[U]

[51] Int. Cl.³ ............................................. B32B 31/00
[52] U.S. Cl. .................................. 156/510; 156/211; 156/258; 156/304.2; 156/535
[58] Field of Search ............ 156/503, 159, 211, 304.2, 156/258; 144/216, 217; 269/41, 42

[56] References Cited

U.S. PATENT DOCUMENTS

| 380,632 | 4/1888 | Lyman | 269/41 |
|---|---|---|---|
| 451,089 | 4/1891 | Wagoner | 269/41 X |
| 541,952 | 7/1895 | Spilker | 144/217 |
| 2,886,482 | 5/1959 | Huffman | 156/258 X |

Primary Examiner—David A. Simmons
Attorney, Agent, or Firm—Darby & Darby

[57] ABSTRACT

Apparatus for making corner joints of sealing plastic profiles, or moldings, for windows, doors or the like, including a base plate on which two profile holding means, each having a bottom formed with a groove for accommodating the continuous profile to be held and a pivotable lid for covering or opening the accommodating groove are mounted, one fixedly and one pivotally. A welding means pivotable relative to the holding means, is provided which cuts the miter with the holding means in line and heats the cut edges. The pivotal holding means is moved toward the fixed one and the cut and heated edges of the profile are welded together.

18 Claims, 5 Drawing Figures

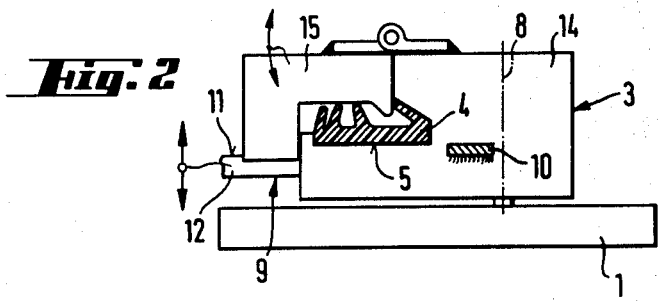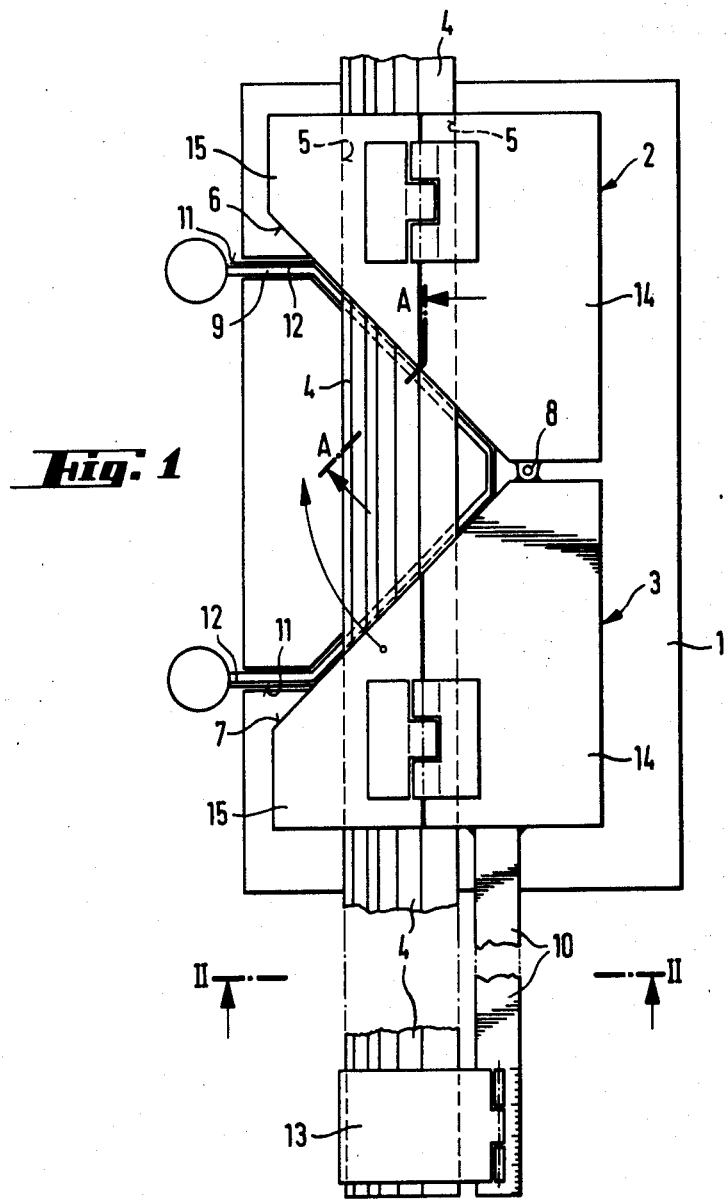

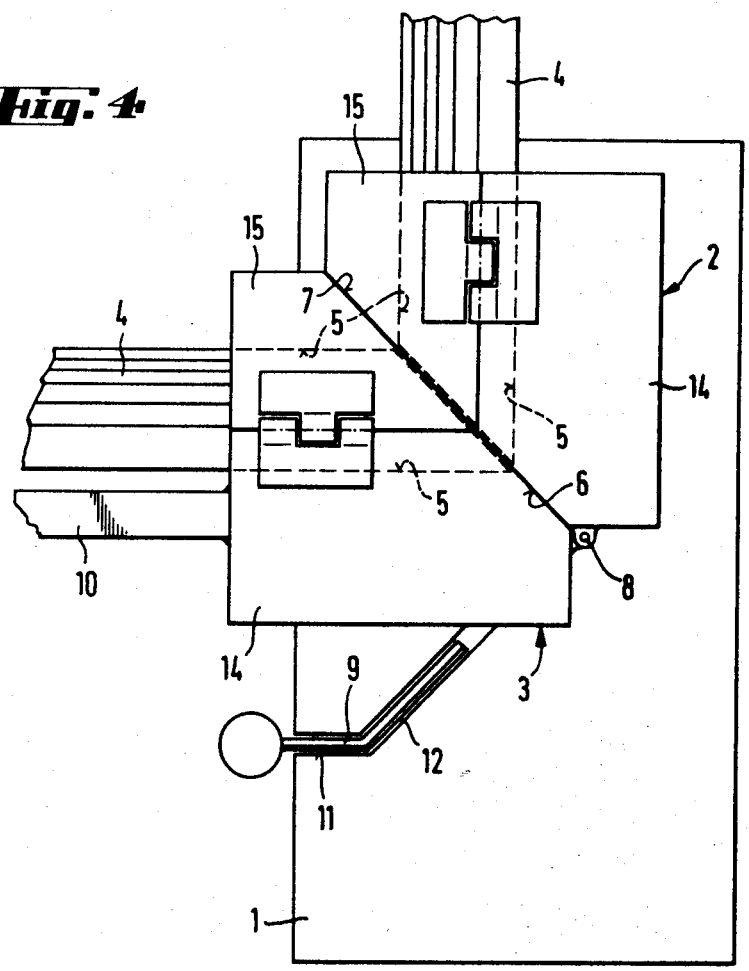
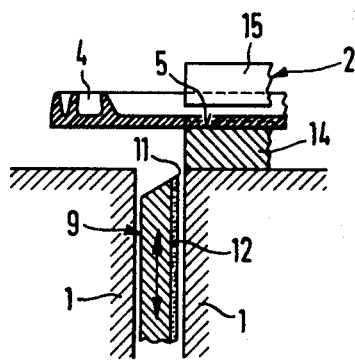
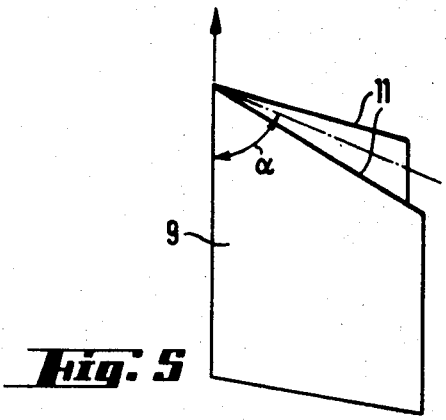

APPARATUS FOR MAKING CORNER JOINTS OF SEALING PROFILES FOR WINDOWS, DOORS OR THE LIKE

BACKGROUND OF THE INVENTION

For the sealing between blind frame and wing frame in windows, door wings or the like, sealing profiles or molding running around the entire inner surface of the frames are required. To obtain complete sealing, care must be taken that the allround sealing profile is closed in itself, i.e. that the profile ends facing one another are actually joined with one another. To that end, the ends of the continuous profiles facing one another in the corner areas are mitered in such a way that the miter joints of profiles arriving from different directions lie perfectly against each other and can then be glued together, welded together where the profiles of plastic, or in the case of rubber profiles, vulcanized together.

To make such corner joints of sealing profiles by welding together the ends of the profile, it has been necessary up till now to first cut the ends of the continuous sections in a cutting or punching means to produce the desired degree of miter and then in a separate procedure weld together the ends of the thus cut or punched continuous sections in a suitable welding device. In many cases, it has been found difficult to achieve a perfect joint of the sealing profiles in the corner areas of the frame, the occurrence of slit places, irregular joints and the like being able to reduce considerably not only the sealing effect, but also the heat and sound insulation of such seals. To avoid such difficulties, it is of utmost importance that the miters at the end locations of the profiles are made in an extremely careful and uniform manner and that furthermore the ends of such profiles are welded together under practically uniform conditions over the entire welding area. Only when these precautions and preconditions are assured can a time-consuming, expensive and labor-intensive aftertreatment of such corner joints be avoided.

A known welding device for the welding of the end places of sealing profiles, particularly with corner joints, has been described in West German DE-GM No. 79 11 997. The two profile ends mitered in a preceding operation are in this known device inserted in two profile holding means which are arranged on a base plate, on which a welding machine with a welding plate is also mounted. The two holding means are arranged at an angle relative to one another and their end areas so aligned in accordance with the miter angles at the profile end places that after insertion of the profiles the holding means which are shiftable toward each other at an angle in the longitudinal direction of the profile can so be brought against each other that the profile end places lie precisely against one another. A welding machine with a fixed plate is further provided towards which the two holding means are movable in such a way that the miter surfaces to be joined at the profile ends from both sides of the welding plate can be pressed against the latter. As a result, the corresponding end places of the two profile ends are heated to such a degree that upon moving the holding means away from the welding plate and immediate manual pressing together of the two holding means (and thus also of the heated profile end points against each other) the desired weld seam can be produced.

While this known device allows with proper operation a satisfactory welding together of the ends of sealing profiles, especially for making corner joints, the device is relatively complicated in that not only a relatively large base plate with the holding means must be movable relative to the welding blade, but also the two holding means must on their part be shiftable relative to the base place carrying them. These multiple, mutually superposed shifting movements require also increased attention on the part of the operator in order to correctly execute the required coordination of the individual movements relative to each other. Care must be taken, for example, that the holding means accommodating the two miter sections of the profile ends are not fully pushed together prior to being moved toward the welding plate, since then an insertion of the welding plate between the same for heating the end areas of the profiles would no longer be possible. The operator must thus take care that the two holding means after insertion of the profiles are shifted against one another only to such a degree as to leave sufficient space to allow upon shifting toward the stationary welding plate an insertion of the latter between the miter sections. Furthermore, the known device can be used only as welding means. The prior diagonal cutting of the profile ends to produce the desired accurate miter cut cannot be done with this known device.

BRIEF DESCRIPTION OF INVENTION

The present invention provides an improvement over the prior art and offers a device which together with greater simplicity of operation makes possible not only a welding together, but also a perfect execution of the miter for both the profile end points to be joined. According to the invention, this is achieved with a device of the type mentioned above in that the two holding means are arranged on a base plate side by side with each other with accommodating grooves aligned flush with one another. The holding means on their sides facing each other have closing edges running symmetrically relative to each other and diagonally to the direction of alignment of the accommodation grooves, which closing edges form an angle opening toward one side of the holding means. One of the two holding means is mounted pivotable about a pivot on the base plate so as to have its diagonal closing edge lie against the closing edge of the second holding means. The welding means has a blade fitted with a cutting edge formed in accordance with the angle between said closing edges, which welding means is pivotable along the height of the diagonal closing edges and pivotable into the latter.

The device according to the invention greatly facilitates the production of hot-welded corner joints. The accurate alignment of the accommodating grooves in both holding means makes it possible for a single continuous profile to be placed therein and to be fixed in position after closing of pivotable lids. The two holding means lie side by side with each other in such a way as to form an angle opening toward one of their sides on the sides facing one another due to the closing edges running diagonally to one another, into which angle the welding element designed as welding blade can be inserted.

The welding blade which is preferably recessed in the base plate and is pivotable out of the base plate by means of a foot pedal. The blade is raised from the base plate with its form matching the angle between the two holding means. Alternatively, the blade can be lowered from above in between the holding means. The cutting edge of the welding blades cuts an essentially triangular section out of the continuous profile and at the same time producing the desired miters on the profile at the closing side of each holding means. The originally continuous profiled section is now divided into two sections as a result of this cutting operation, each of which ending in one of the profile sections.

The cutting operation provides the desired accurate mitered cut on the side edges of the holding means facing one another and running diagonally to the longitudinal axis of the profile. Since the cutting edge performs here at one and the same time the function of a welding tool it results in that during and subsequent to the cutting by the cutting element the two obtained profile sections are heated respectively at their diagonally cut off ends (to temperatures to be selected as a function of the material used, but usually lying above 100° C. to assure a neat welding joint). After completion of the cutting operation, the heating facilitating the cutting process, the welding blade is pivoted again out of the plane of the continuous profile section.

To conclude the operation, all that is needed is a simple manual, or automatic, pivoting of the pivotable holding means in such a way that its diagonal side edge lies against the diagonal side edge of the second holding means. Upon execution of this simple and quickly realizable pivoting motion, the intersections of the two profile sections just heated by the hot welding blade lie against each other in this hot state. Pressing of the pivotable holding means against the other will then produce the desired welding joint, the simplicity of this rotary motion presenting no problems whatsoever for the operator of the machine.

Preferably, only one holding means is pivotable, the second being mounted stationary on the base plate. As a result of this arrangement, the operator has only to carry out one rotary movement on one holding means and exercise pressure only on the latter.

A preferred embodiment of the device according to the invention utilizes a welding blade provided with a cutting edge extending in both directions and of generally triangular shape. As a result, the welding blade has to execute for the cutting and heating operations only one relative movement from below the inserted continuous profile to above, or vice versa, and a return to the starting position is no longer required, since the countermovement of the welding blade is then utilized already for the miter cut for the following corner joint.

To immediately secure the required and/or desired profile lengths after executing the miter cut a gauge extending from the pivotable holding means in the direction of alignment of the accommodation grooves and placed laterally to the accommodation groove is preferably mounted on the base plate. Preferably, this gauge is pivotable together with the pivotable holding means and in a further feature of the invention, the device has a profile tensioning rod or a profile tensioning clamp or the like by means of which the sealing profile lying next to the gauge after insertion of said profile in the holding means, and after the setting of its length according to the data on the gauge, can be clamped at the gauge. As a result, a position-fixed alignment of the continuous profile emerging from the pivotable holding means is assured also during the pivoting motion.

A further advantage is obtained when the cutting edge or cutting edges on the welding blade are designed as chamfers.

A further advantage results when the welding blade is constructed as heatable protractor and preferably is made of steel or copper with a surface layer of TEFLON, silver or chrome. This surface layer will permit easier removal of welding residues after each miter cut. Preferably, again, the profile clamp is mounted shiftable on the gauge.

In a preferred embodiment of the device according to the invention a pivoting means is provided which, after the return of the welding blade from the cutting plane, automatically executes the pivoting motion of the pivotable holding means and the placing of its closing edge against that of the second holding means. Preferably, the plane of the cutting edges is set diagonally to the direction of the cutting motion.

The device according to the invention has a particularly simple design and is functionally operable by even completely unskilled operating personnel, without any danger of faulty operations whatsoever. A shifting of various elements against one another, particularly within the scope of mutually superimposed shifting motions, is likewise dispensed within the device according to the invention. In addition, there is furthermore the important advantage that the precise making of miter cuts as well as the hot-welding operation can be carried on one and the same device, thus avoiding constant removal and re-insertion of profiles with the attendant irregularities in alignment to one another. A once inserted continuous profile is brought into a position-fixed position within which it remains during the various processing steps and from which extremely accurately producible miter cuts are rigidly moved into a precisely defined and fixed welding position.

Preferably, a wiping means is provided by means of which the welding means is cleaned upon its moving out of the welding position. As a result, contaminations of the welding surface due to adhering of molten profile material can be mechanically removed immediately after welding. Alternatively, the removal of such undesirable deposits on the welding surface can also be effected by immersion of the welding knife in suitable chemical solvents or by brief heating of the welding knife to very high temperatures.

BRIEF DESCRIPTION OF THE DRAWINGS

The invention will now be explained more fully with reference to the drawings, wherein FIG. 1 shows a top view of a device according to the invention with an inserted continuous profile;

FIG. 2 shows a side elevation of a holding means in a device according to the invention with inserted continuous profile and closed lid;

FIG. 3 shows a detail section along A—A of FIG. 1;

FIG. 4 shows a top view of the device according to the invention after rotation of one holding means to the welding position;

FIG. 5 shows a diagrammatic view of a welding blade with diagonally arranged cutting edge plane.

DETAILED DESCRIPTION OF PREFERRED EMBODIMENTS

The device according to FIG. 1 shows the respective holding means 2 and 3 mounted side by side on a base plate 1. In an accommodating groove 5 (FIG. 2) formed in each holding means 2 and 3 a continuous profile section 4 of PVC or any other suitable flexible and weldable material is inserted. As shown in FIG. 2, the holding means 2 and 3 have bottom forms 14 which are preferably made of aluminum or synthetic resin. Accommodation groove 5 for the sealing profile is formed in these bottom forms 14.

On the upper side of bottom form 14 a lid 15 pivotably mounted in an upward direction by a hinge 15a. Lid 15 is also preferably made of aluminum or synthetic resin. In the illustration according to FIG. 1, the two lids 15 of holding means 2 and 3 are closed after insertion of continuous profile section 4 so as to fix the continuous profile section in position within the holding means.

While holding means 2 is fixedly fastened in position on base plate 1, holding means 3 is mounted about a pivoting axis 8 so that it can be pivoted in the direction shown by an arrow in FIG. 1 toward the holding means 2 until it closely lies against the latter (see pivoted illustration in FIG. 4). The holding means 2 and 3 have on their facing sides two diagonal edges 6 and 7 running symmetrical to one another. The same lie in two planes which intersect at the axis of rotation 8 of holding means 3, the said axis being offset slightly laterally to continuous profile section 4. The diagonal side edges 6 and 7 of holding means 2 and 3 run from the directions of axis of rotation 8 up to the outside side edges 16 of holding means 2 and 3 in an angle opening toward the continuous profile, said side edges 16 running at a lateral distance from continuous profile 4.

A welding blade 9 which can be of copper with a surface layer 12 of TEFLON, silver or chrome designed in general form of a protractor with straight sides (see also the illustration of FIG. 3). Blade 9 has at its upper edge a cutting edge 11 and it is heated directly, by electric heating wires, or indirectly. The blade can be raised from below out of base plate 1 by a suitable device (not shown) such as a pusher to cut out the section of continuous profile 4 running between the two diagonal edges 6 and 7 of the holding means 2 and 3 (see also FIG. 3).

Upon pivoting of welding blade 9 out of base plate 1 into the cutting plane there is first cut out the center section of continuous profile 4 and suitably removed by means (not shown). At the same time, due to the heated surface of welding blade 9, the end points of profile 4 cut off and firmly held in holding means 2 and 3 are brought to the required temperature which is above 100° C., and with PVC materials preferably up to 180° C.

After pivoting the welding blade 9 back down into base plate 1, the operator pivots the pivotable holding means 3, with its lid 15 still closed, together with a gauge 10. The protruding part of continuous profile 4 has its end firmly clamped by a clamping device 13 for an accurate position fixation at the end of said gauge (see FIG. 1), into the position shown in FIG. 4. In this position, the heated borders of the two sections of continuous profile 4 are in correct alignment with each other and are thus by mutual pressure welded together in the exact position.

Instead of being pivoted downward into the base plate, the welding blade could, of course, be also pivoted upward. In the latter case, the welding blade would have to be raised to such a height as not to interfere with the insertion of the continuous profile 4 into the holding means 2 and 3 or with the pivoting of holding means 3 by the operator. If, as described in the illustration according to FIG. 1, the welding blade is pivoted downward into base plate 1 it would be preferable to operate welding blade 9 by way of a pivoting mechanism foot-operated by the operator. In this case, the base plate 1 is preferably designed as a small, firmly fixed table which is provided with the required pedals arrangement and takes up the mechanism for raising and lowering welding blade 9. If, on the other hand, the device is to be used in various ways and be readily transportable, then pivoting of the welding blade in upward direction would be preferable (somewhat in the form of a swiveling motion toward the top). In the latter case, the pivoting mechanism can then be mounted above on base plate 1, without requiring a firmly fixed table or the like as above.

Gauge 10 may also be fastened on the base plate 1 so as to be immovable. In this case, the profile tensioning clamp 13 is mounted shiftable on the gauge. After insertion of the continuous profile, it is first pulled out to the desired length as set on the gauge, clamped, cut and welded. Following that, the holding means 2 and 3 are opened again, the welded corner joint taken out, the continuous profile 4 with the corner joint again pulled out in accordance with the desired length on the side of the gauge, clamped again, cut and welded. This can be continued until completion of the sealing frame. For the last corner of the frame, only the two remaining ends of the continuous profile are then inserted into the device, cut to the proper miter and welded to the final frame. In this way, starting from a continuous profile, a continuous production of also closed sealing frames is made readily possible.

FIG. 5 shows a basic side view of a welding blade 9, wherein the plane in which the angular cutting edge 11 is disposed is set diagonally to the direction of movement (arrow) during the cutting process by an angle which is smaller than 90°. As a result, the energy expenditure at the cutting process is reduced in that the cutting edge 11 does not simultaneously come in contact with the continuous profile 4 over its entire cutting length, but executes the full cutting length only with an increasing cutting path. First, the most forward tip of the welding blade facing the continuous profile (the upper one in FIG. 5) intersects the profile, the cutting process starts there locally, and with increasing cutting path (i.e. lift of welding blade 9) the cut on continuous profile 4 is always made only within a small localized cutting area, this enabling the use of only small forces.

To remove any adhering sealing profile material from the welding blade 9 after the latter is pivoted out of the welding position and thus prevent adherence of the material on the welding blade, a suitable (not shown) mechanical wiping means is provided which automatically wipes off any adhering material upon pivoting of the welding blade out of the welding position. Any suitable device in form of wipers, scrapers or the like may be used for this purpose. Alternatively, dipping of the welding blade 9 in a suitable chemical solvent or brief heating of the welding blade to a very high temperature (during the pivoting process) may be employed for this purpose.

I claim:
1. Apparatus for making corner joints from lengths of profiles of plastic material comprising:
   a base,
   a pair of profile holding means on said base, one of said profile holding means being pivotally mounted relative to said base, said pair of profile holding means when aligned holding a continuous length of the profile which extends into both said holding means, each of said profile means having an oppo- sitely angled side across which the profile extends such that when the two profile holding means are aligned a section is formed which has an included angle between said sides which opens towards the front faces of said pair of profile holding means, and heat welding means including a blade which fits within the angled sides between the two profile holding means to cut the profile extending into said section and to heat the edges of the pieces of profile remaining in each of said holding means, the pivoting of said one profile holding means bringing the heated edges of said profile pieces into contact to weld said pieces and hold the same together.

2. Apparatus as in claim 1 wherein each of said profile holding means is formed with a recess for holding the profile length, and cover means for closing a said recess and holding the profile therein.

3. Apparatus as in either of claims 1 or 2 further comprising means for moving said heat welding means into and out of said section.

4. Apparatus as in claim 3 wherein said blade is located below the upper surface of said base plate, said moving means moving said blade upwardly into said section to cut the profile and then downwardly to retract the blade into said base plate.

5. Apparatus as in claim 1 wherein the other holding means is mounted stationary on the base plate.

6. Apparatus according to claim 1 wherein the blade of said heat welding means is shaped to conform to the shape of the section between the angled edges of said pair of holding means.

7. Apparatus as in claim 6 wherein said blade is continuous and is of generally triangular shape.

8. Apparatus according to claim 1 further comprising a gauge extending from the pivotable holding means.

9. Apparatus as in claim 8 further comprising a profile tensioning means mounted on said gauge means.

10. Apparatus as in claim 9 wherein said profile tensioning means is slidably mounted on said gauge means.

11. Apparatus as in claim 1 wherein the cutting edge of the blade is chamfered.

12. Apparatus as in claim 1 wherein the blade of said heat welding means is formed of a metal which is both electrical and heat conductive, and a coating of a release material on the surface of the blade facing the angled sides of said pair of profile holding means.

13. Apparatus as in claim 12 wherein said coating of release material is selected from the group consisting of TEFLON, silver or chrome.

14. Apparatus as in claim 1 further comprising gauge means mounted on said base plate.

15. Apparatus as in claims 1, 6 or 7 wherein the blade of said heat welding means has a surface of varying height relative to said base plate so that the surface of the blade gradually intersects said profile to cut it.

16. Apparatus as in claim 15 wherein the surface of the blade is at an angle of less than 90° relative to a line perpendicular to said base plate.

17. Apparatus as in claim 16 wherein said angle is between about 45° and 60°.

18. Apparatus as in claim 1 further comprising means for wiping the blade clean upon movement out of its welding position.

* * * * *